United States Patent
Chen et al.

(10) Patent No.: US 6,950,664 B2
(45) Date of Patent: Sep. 27, 2005

(54) GEOLOCATION USING ENHANCED TIMING ADVANCE TECHNIQUES

(75) Inventors: Byron Hua Chen, Whippany, NJ (US); Tung Ching Chiang, Berkeley Heights, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 502 days.

(21) Appl. No.: 10/056,127

(22) Filed: Jan. 24, 2002

(65) Prior Publication Data

US 2003/0139188 A1 Jul. 24, 2003

(51) Int. Cl.[7] ................................................ H04Q 7/20
(52) U.S. Cl. ..................... 455/456.5; 455/446; 342/450
(58) Field of Search .......................... 455/456.1, 456.5, 455/456.2, 517, 446, 422.1, 67.11, 524, 525; 342/118, 126, 146, 357.01, 450, 459, 463; 370/498, 508

(56) References Cited

U.S. PATENT DOCUMENTS

| | | | | | |
|---|---|---|---|---|---|
| 5,423,067 | A | * | 6/1995 | Manabe | 455/524 |
| 6,321,083 | B1 | * | 11/2001 | Vaara et al. | 455/456.1 |
| 6,570,529 | B2 | * | 5/2003 | Richton et al. | 342/357.02 |
| 2003/0119524 | A1 | * | 6/2003 | Carlsson | 455/456 |
| 2003/0139188 | A1 | * | 7/2003 | Chen et al. | 455/456 |
| 2004/0203921 | A1 | * | 10/2004 | Bromhead et al. | 455/456.1 |

* cited by examiner

Primary Examiner—Rafael Perez-Gutierrez
(74) Attorney, Agent, or Firm—Jimmy Goo

(57) ABSTRACT

A method of geolocation that is backward compatible and more accurate than the well-known Cell/Sector ID method is provided. The geolocation method provided comprises the steps of determining a set of candidate locations for the mobile-station based on a timing advance value associated with the mobile-station and determining a location of the mobile-station using the set of candidate locations and signal strength measurements associated with same cell-neighboring sectors or different cell-neighboring sectors.

17 Claims, 9 Drawing Sheets

GEOLOCATION USING ENHANCED TIMING ADVANCE TECHNIQUES

FIELD OF THE INVENTION

The present invention relates generally to systems for locating wireless communication devices and, in particular, to wireless location systems using timing advance techniques.

BACKGROUND OF THE RELATED ART

There exists a variety of techniques for determining a position for a mobile-station or some other wireless communication device. These positioning techniques include the well-known Cell/Sector ID method, Enhanced Observed Time Difference (E-OTD) and Assisted Global Positioning System (AGPS).

The Cell/Sector ID method involves determining a position of a mobile-station based on the identity of a base station currently serving the mobile-station, i.e., serving base station. FIG. 1 depicts a cell 10 associated with a base station, not shown, that is currently providing wireless communication services to a mobile-station 12. The identity of the serving base station, the cell associated with the serving base station, and the location of the cell are known by the wireless communication network to which the base station belongs. Based on these known parameters, the Cell/Sector ID method can be used to determine an approximate position for mobile-station 12. Specifically, if cell 10 is a non-sectorized cell, mobile-station 12 would be determined to be positioned at the centroid of cell 10 using the Cell ID method. If cell 10 is a sectorized cell, mobile-station 12 would be determined to be positioned at the centroid of the sector in which mobile-station 12 is currently located using the Sector ID method.

The average errors associated with positions determined using Cell/Sector ID method for a non-sectorized and a sectorized cell would be $$\frac{1}{\sqrt{2}}$$

R and 0.433R, respectively, where R represents a radius of cell 10. Depending on the radius of cell 10, the average error associated with the Cell/Sector ID can be quite large and, thus, unacceptable. For example, if cell 10 has a radius R of 5 km, then the average error for a non-sectorized and a sectorized cell would be about 3500 m and 2200 m, respectively.

The E-OTD and AGPS methods are much more accurate positioning techniques than the Cell/Sector ID method. However, the E-OTD and AGPS methods are not backward compatible from the perspective of second generation mobile-stations. That is, the E-OTD and AGPS methods require the mobile-station to have additional hardware/ software not currently in second generation mobile-stations.

Accordingly, there exists a need for a positioning technique that is backward compatible and more accurate than the Cell/Sector ID method.

SUMMARY OF THE INVENTION

The aforementioned problems of backward compatibility and location accuracy can be overcome or improved using timing advance principles and signal strength measurements. In one embodiment, the present invention comprises the steps of determining a set of candidate locations for the mobile-station based on a timing advance value associated with the mobile-station, and determining a location of the mobile-station using the set of candidate locations and signal strength measurements associated with same cell-neighboring sectors or different cell-neighboring sectors. Advantageously, timing advance values and signal strength measurements are readily available in most second generation wireless communication networks, thus, no new hardware or software are required in existing second generation mobile-stations. Additionally, the present invention uses timing advance values to select an area smaller than cells and sectors in which mobile-stations may be located and signal strength measurements to specify a location within the selected area, thereby obtaining a more accurate location of the mobile-stations than the Cell/Sector ID method.

BRIEF DESCRIPTION OF THE DRAWINGS

The features, aspects, and advantages of the present invention will become better understood with regard to the following description, appended claims, and accompanying drawings where

DETAILED DESCRIPTION

The present invention is a backward compatible positioning technique that utilizes timing advance principles and signal strength measurements, as will be described herein. For purposes of discussion, the present invention will be described herein with respect to wireless communication networks based on the well-known Global System for Mobile communication (GSM) standard. It should be understood that the present invention is may also be applicable to wireless communication networks based on other multiple access techniques.

Figure 1:
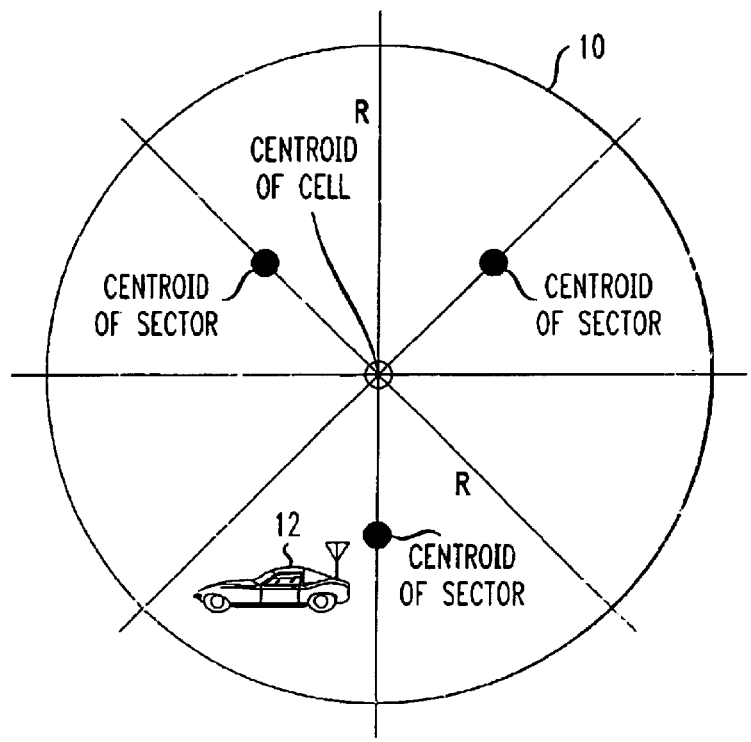
FIG. 1 depicts a cell associated with a base station that is currently providing wireless communication services to a mobile-station in accordance with the prior art.
Figure 2:
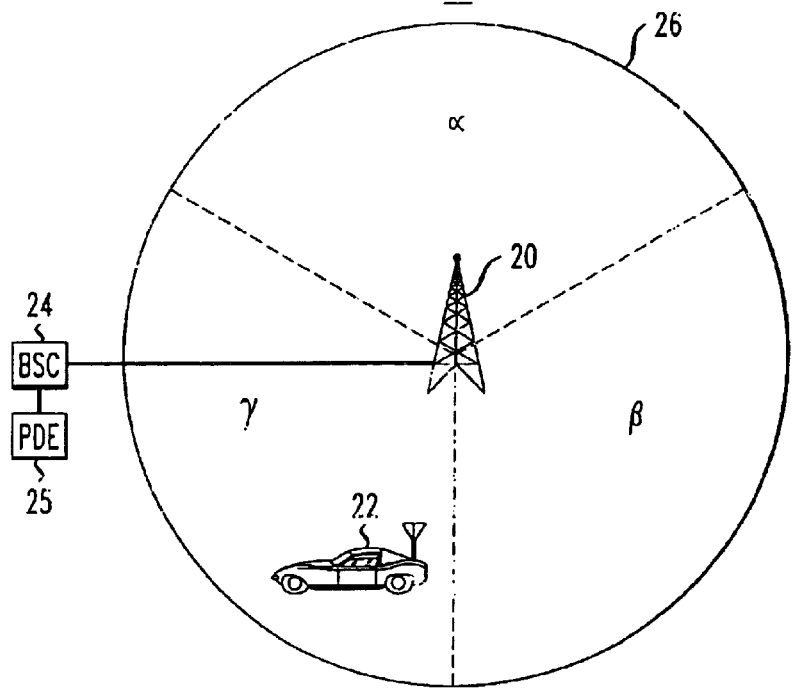
FIG. 2 depicts an embodiment of a wireless communication network employing the GSM standard in accordance with the present invention.

FIG. 2 depicts an embodiment of a wireless communication network 18 employing the GSM standard in accordance with the present invention. Wireless communication network 18 comprises a base station (BS) 20, a mobile-station (MS) 22, a base station controller (BSC) 24 and a position determination entity (PDE) 25. BS 20 provides communication services to a coverage area 26 referred to as a cell. Cell 26 is divided into three sectors α, β and γ. For each sector, BS 20 transmits a beacon frequency signal. When attempting to gain system access to BS 20, MS 22 measures strengths of the beacon frequency signals transmitted from BS 20 and neighboring base stations. Such measurements are reported back to BS 20 by MS 22 and used to determine a serving base station and a sector in which MS 22 is currently located, e.g., base station and sector associated with highest beacon frequency signal strength measurement are deemed the serving base station and sector in which MS 22 is located. The sector in which MS 22 is located becomes the sector in which BSC 20 will provide communication services, i.e., serving sector, to MS 22. For illustration purposes, BS 20 is used herein as the serving base station. A traffic channel belonging to the serving sector is assigned to MS 22. After the traffic channel has been assigned, MS 22 will continuously measure the strengths of beacon frequency signals and report such measurements back to serving BS 20 which, in turn, may report the measurements, along with the identification of the serving sector, i.e., sector ID, to BSC 24. Note that in wireless communications networks employing Code Division Multiple Access (CDMA) techniques, pilot signal strength measurements would be substituted for the beacon frequency signal measurements.

In GSM, communications between mobile-stations and base stations are supported by a physical channel and several logical channels. The physical channel is defined by frequency as well as by time. Uplink and downlink frequencies support duplex communication between the mobile-stations and the wireless communication network, wherein each frequency includes eight repetitive time slot periods providing eight unique access points in time (577-$\mu$s slot duration) for an equal number of mobile-stations. A mobile-station in communication with a base station is assigned a time slot in an uplink frequency and a downlink frequency. The assigned time slots define the traffic channel for MS 22.

One problem with these types of traffic channels is adjacent channel interference. For example, BS 20 transmits bursts to MS 22 over a time slot on the downlink frequency, and receives a related burst from MS 22 over a time slot on the uplink frequency, wherein the uplink time slot occurs three time slots after the downlink time slot. However, due to propagation delay, the uplink burst may not completely arrive within the confines of the expected uplink time slot, e.g., the uplink burst may arrive in the expected uplink time slot and the subsequent uplink time slot, thereby causing adjacent channel interference.

To account for propagation delay, a timing advance (TA) value is assigned to MS 22 and used to reposition the uplink burst such that it arrives at BS 20 in the expected uplink time slot, wherein the timing advance value varies as a function of distance between the base station and the mobile-station. For example, the TA value is calculated by BS 20 and sent to MS 22 in a control message. The TA value is subsequently used by MS 22 to reposition the uplink burst such that the uplink burst is transmitted at a time corresponding to the TA value prior to the uplink time slot, i.e., uplink burst is transmitted time t(TA) before the start of the uplink time slot. The manner of determining the TA value for a particular mobile-station is well-known in the art.

Figure 3:
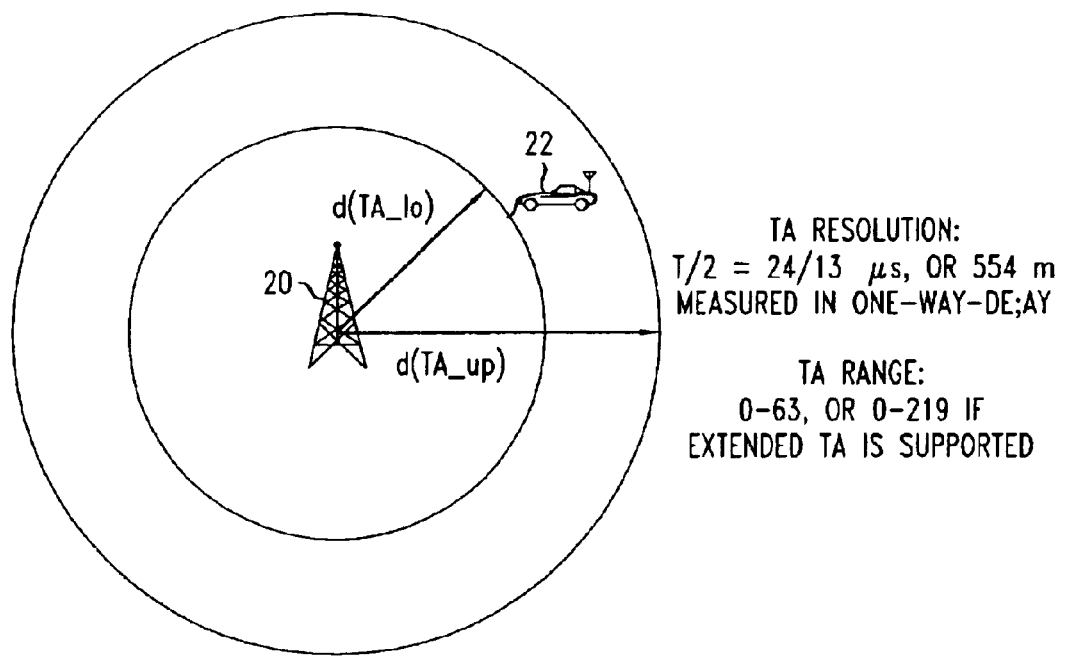
FIG. 3 depicts an example of using timing advance values to determine the location of a mobile-station.

In GSM, there are sixty four possible TA values, wherein each TA value is defined by an upper bound TA_up and a lower bound TA_lo. Each of the TA values correspond to a round trip propagation delay range, where the start and end of the round trip propagation delay range correspond to the upper and lower bounds TA_up and TA_lo, respectively. The TA value determined for a mobile-station can be used to estimate an approximate location of the mobile-station. Specifically, the upper and lower bounds TA_up and TA_lo can be used to predict an area or belt in which the mobile-station is located, wherein the predicted area is defined by a distance d(TA_lo) and a distance d(TA_up) from the base station. That is, mobile-station is located between distance d(TA_lo) and distance d(TA_up) from the base station. FIG. 3 depicts an example 30 of using TA values to determine the location of a mobile-station. In this example, base station 20 determines a TA value for MS 22. The upper and lower bounds TA_up and TA_lo of the TA value are used to determine distances d(TA_up) and d(TA_lo), respectively. MS 22 is determined to be approximately located between distances d(TA_up) and d(TA_lo) from base station 20.

Note that for purposes of this application, the term timing advance value may be construed to include timing advance value, one way propagation delay, round trip propagation delay and any other timing technique which may be used to estimate a distance between two communication devices.

Figure 4:
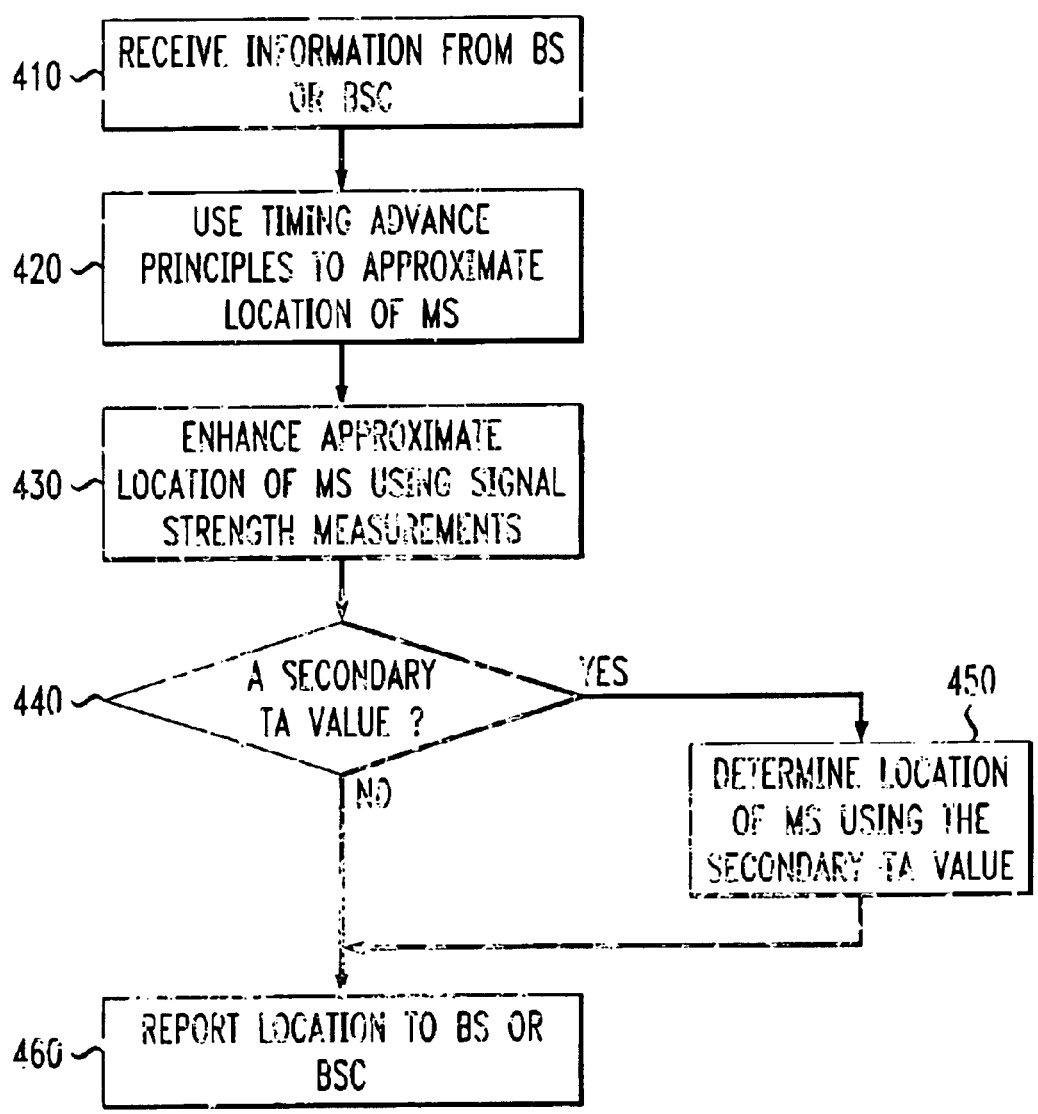
FIG. 4 depicts a flowchart illustrating a method of determining a mobile-station's position utilizing time advance principles and signal strength measurements in accordance with the present invention.

Timing advance principles are used along with signal strength measurements to provide a location determination that is more accurate than the cell/sector I) method. FIG. 4 depicts a flowchart 400 illustrating a method of determining a mobile-station's position utilizing time advance principles and signal strength measurements in accordance with the present invention. The method depicted in flowchart 400 is performed by PDE 25. It should be understood that the steps in flowchart 400 may be performed in a variety of sequences or by an entity different from PDE 25. Therefore, the present invention should not be construed to be limited to the identical sequence of steps illustrated in flowchart 400 nor to PDE 25 performing the method of flowchart 400.

In step 410, PDE 25 receives from BSC 24 or BS 20 information associated with MS 22, serving BS 20 and, perhaps, neighboring base stations. Information associated with MS 22 includes a sector ID (identifying the serving sector), a TA value and beacon frequency signal strength measurements by MS 22. Information associated with BS 20 (and neighboring base stations) may include sector orientation, sector span and the location of BS 20 (and neighboring base stations). In one embodiment, the location of BS 20 is indicated in terms of global coordinates, i.e., latitude/longitude/elevation. If the location of BS 20 is indicated with global coordinates, PDE 25 converts the global coordinates into local coordinates (x,y,z).

Figure 5:
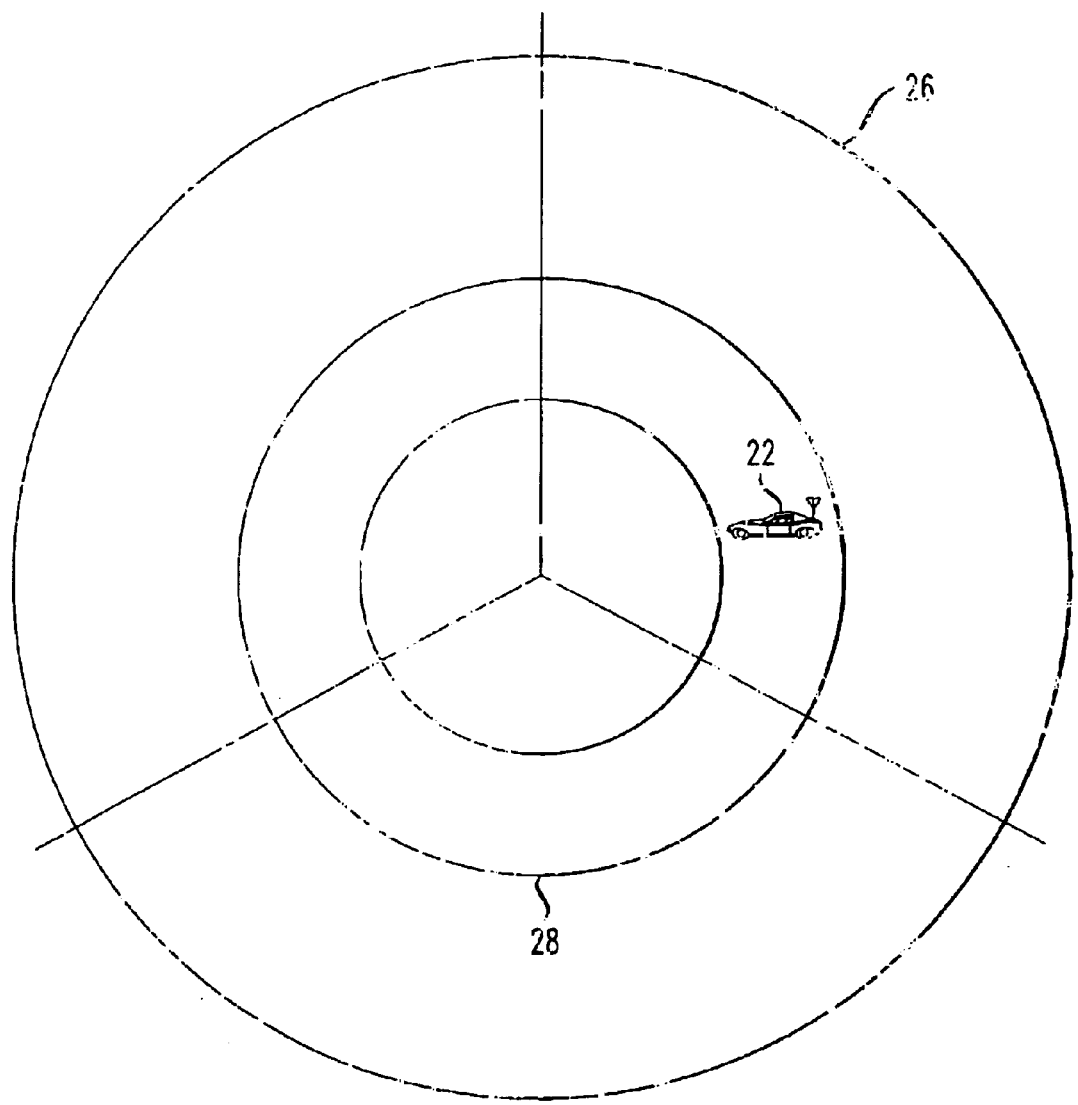
FIG. 5 depicts a timing advance belt in which a mobile-station is located.

In step 420, timing advance principles are used to determine an approximate location of MS 22. Specifically, a predicted area or belt 28 associated with the received TA value for MS 22 is determined. See FIG. 5, which depicts a TA belt 28 in which MS 22 is located. In step 430, signal strength measurements are used to further enhance the approximate location of MS 22. In a first embodiment, signal strength measurements of signals associated with neighboring sectors of the same cell 26 in which the serving sector belongs, i.e., same cell-neighboring sectors, are used to enhance the approximate location of MS 22. In a second embodiment, signal strength measurements of signals associated with neighboring sectors belonging to other cells, i.e., different cell-neighboring sectors, are used to enhance the approximate location of MS 22. In the second embodiment, the different cell-neighboring sector signal strength measurements may be combined with same cell-neighboring sector signal strength measurements. These two embodiments of step 430 will be described herein.

Figure 6:
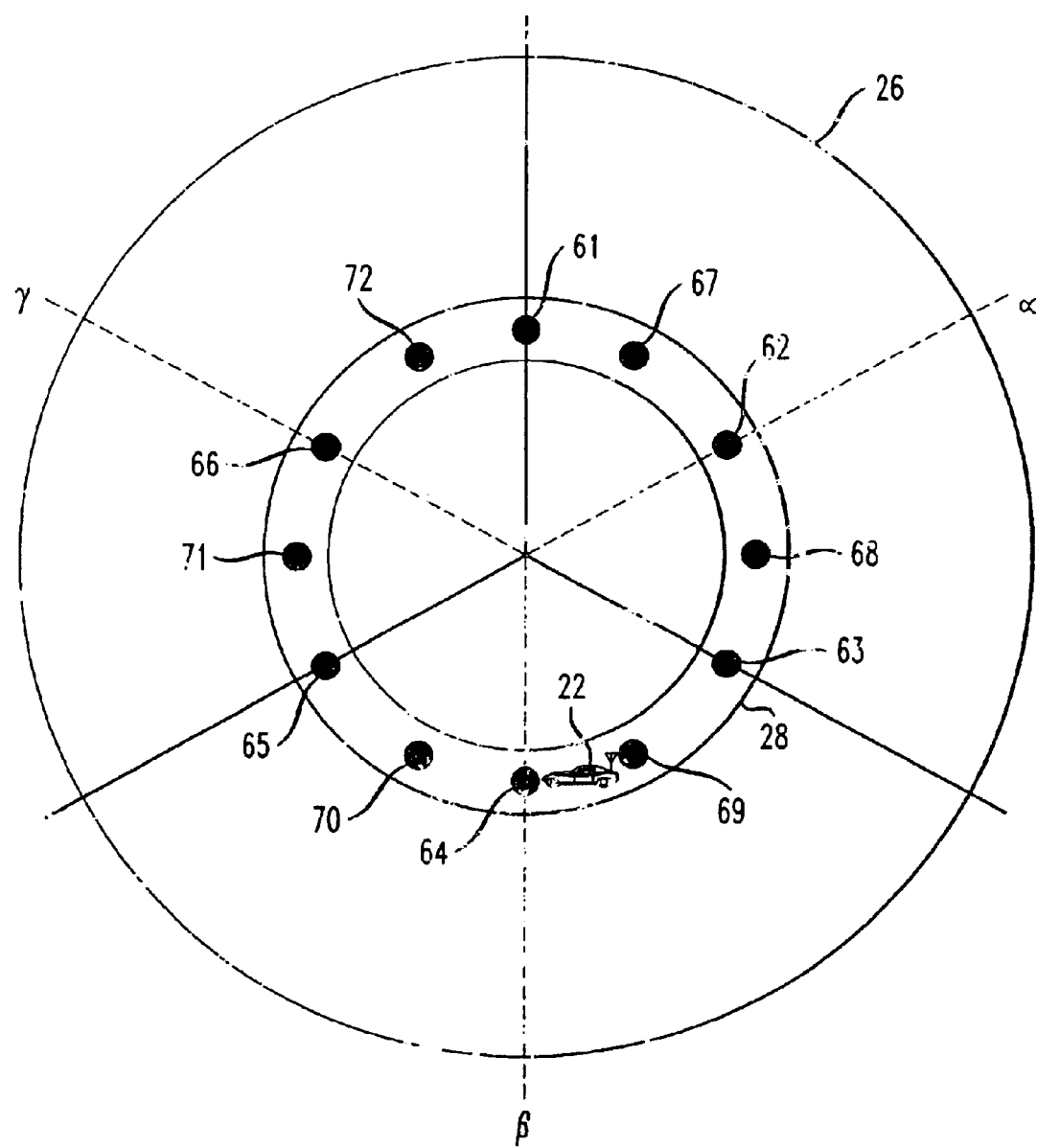
FIG. 6 depicts six candidate locations for the mobile-station within the timing advance belt.

In the first embodiment of step 430, the received beacon frequency signal strength measurements associated with same cell-neighboring sectors are used to determine a location for MS 22. In this embodiment, there are six candidate locations for MS 22 within TA belt 28. These six candidate locations are determined using the sector ID, TA value and information associated with the base station, and are positioned approximately at the intersections of TA belt 28 and center and sector dividers of the cell. Sector dividers are defined by the radio frequency (RF) coverage of each cell and may not be straight lines. The sector dividers may, however, be approximated as straight lines using conventional least-square-estimation method. Center dividers are lines associated with sectors that extend outward from the center of a cell towards the edge of the cell approximately dividing the associated sector in half. FIG. 6 depicts these six candidate locations 61, 62, 63, 64, 65 and 66 for MS 22 within TA belt 28. The six candidate locations include the intersections of TA belt 28 and center dividers of the serving cell, i.e., candidate locations 62, 64 and 66, and the intersections of TA belt 28 and sector dividers, i.e., candidate locations 61, 63 and 65.

Figure 7:
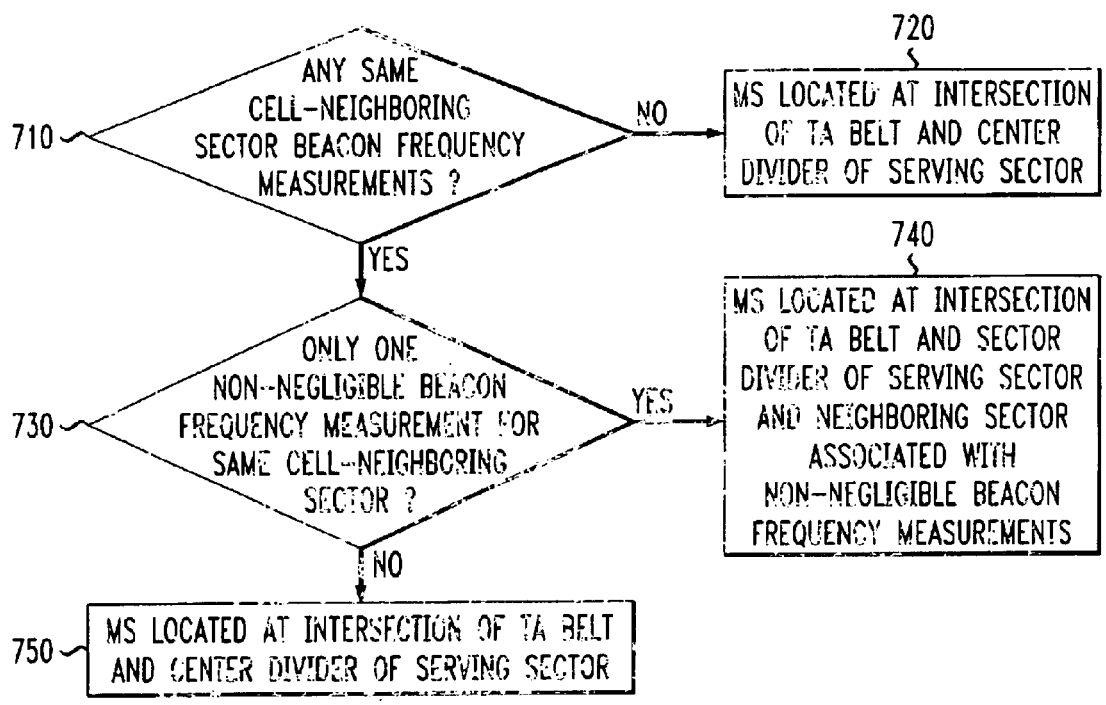
FIG. 7 depicts a flowchart illustrating a first embodiment of step 430 of the flowchart of FIG. 4.

One of candidate locations is selected as the location of MS 22 using the beacon frequency signal strength measurements associated with same cell-neighboring sectors and sector ID. FIG. 7 depicts a flowchart 700 illustrating the first embodiment of step 430. In step 710, PDE 25 determines if any non-negligible beacon frequency signal strength measurements associated with any same cell-neighboring sectors were received in step 410. A beacon frequency signal strength measurement is deemed negligible if the measurement is below a threshold value. If PDE 25 did not receive any non-negligible beacon frequency signal strength measurements associated with any same cell-neighboring sector, then PDE 25 determines that MS 22 is located at the candidate location defined by the intersection of TA belt 28 and the center divider of the serving sector indicated by the received sector ID, in step 720.

Otherwise, flowchart 700 continues to step 730 where PDE 25 determines if only one non-negligible beacon frequency signal strength measurement associated with a same cell-neighboring sector was received. If PDE 25 received only one non-negligible beacon frequency signal strength measurement associated with the same cell-neighboring sectors, then PDE 25 determines that MS 22 is located at the candidate location defined by the intersection of TA belt 25 and the sector divider of the serving cell and the same cell-neighboring sector associated with the non-negligible beacon frequency signal strength measurement, in step 740. Otherwise, in step 730, it is determined that PDE 25 received non-negligible beacon frequency signal strength measurements associated with both of the same cell-neighboring sectors. Flowchart 700 continues to step 750 where PDE 25 determines that MS 22 is located at the candidate location defined by the intersection of TA belt 28 and the center divider of the serving sector.

In the second embodiment of step 430, signal strength measurements of signals associated with different cell-neighboring sectors and same cell-neighboring sectors are used to enhance the approximate location of MS 22. In this embodiment, there are a total of twelve candidate locations for MS 22 within TA belt 28. The twelve candidate locations include the six candidate locations 61, 62, 63, 64, 65 and 66 associated with the first embodiment and six additional candidate locations 67, 68, 69, 70, 71 and 72 interposed between candidate locations 61, 62, 63, 64, 65 and 66, as shown in FIG. 6.

Note that the first and second embodiments of step 430 utilize six and twelve candidate locations, respectively, within TA belt 28 from which a location for MS 22 is determined. It should be understood that the present invention should not be limited to these six and twelve candidate locations. Additional, fewer or some number in between of candidate locations are possible. Further note that the candidate locations are being depicted in FIG. 6 along center and sector dividers. It should be understood that the candidate locations need not be along these dividers.

Figure 9:
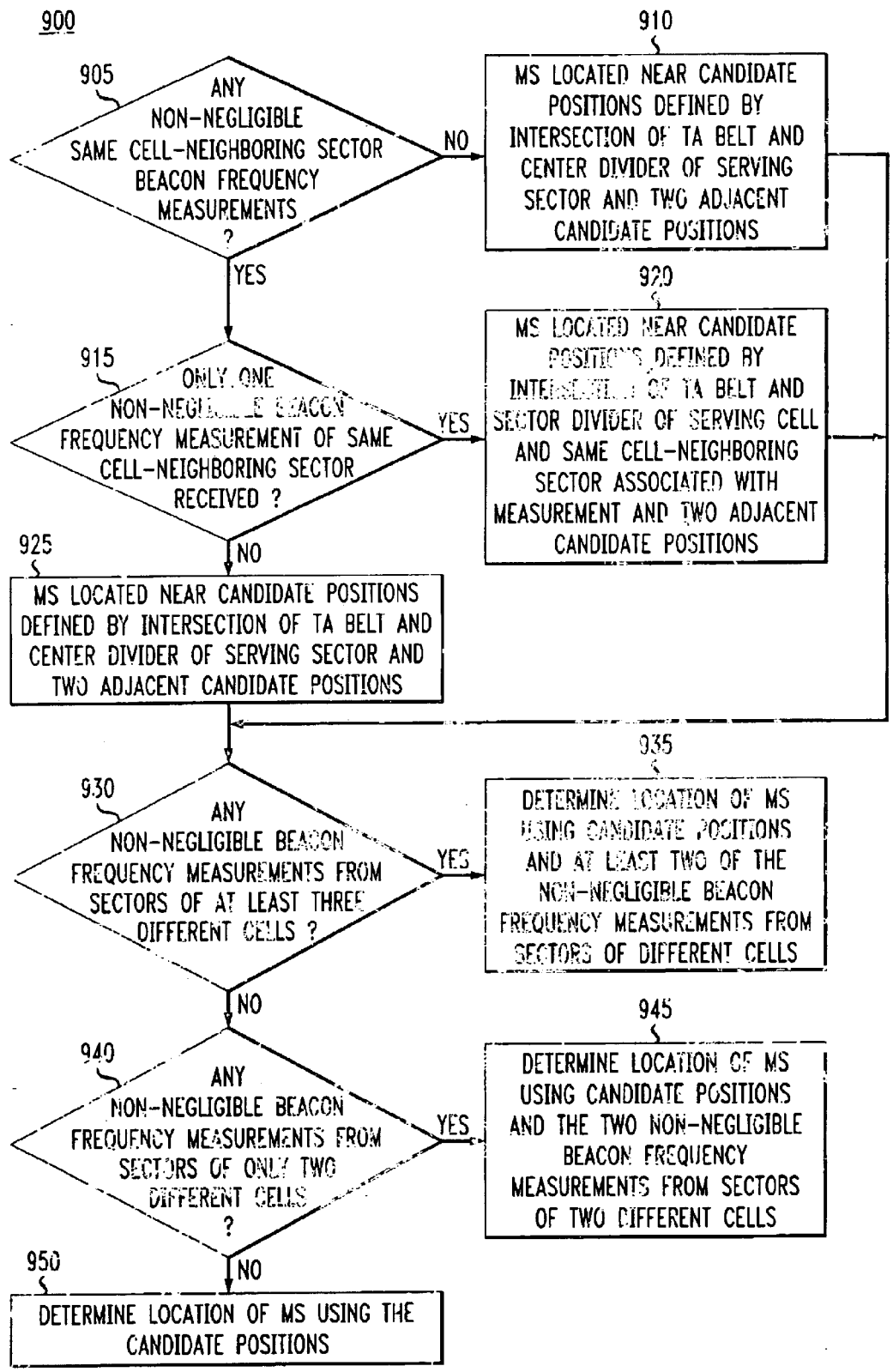
FIG. 9 depicts a flowchart illustrating a second embodiment of step 430 of the flowchart of FIG. 4.

FIG. 9 depicts a flowchart 900 illustrating the second embodiment of step 430. In step 905, PDE 25 determines if any beacon frequency signal strength measurements associated with any same cell-neighboring sectors were received in step 410. If PDE 25 did not receive any non-negligible beacon frequency signal strength measurements associated with any same cell-neighboring sectors, then PDE 25 determines, in step 910, that MS 22 is located at or near one of three candidate locations: the candidate location defined by the intersection of TA belt 28 and the center divider of the serving sector indicated by the received sector ID, and the two adjacent candidate locations. For example, suppose MS 22 is currently being served by sector β and no beacon frequency signal strength measurements associated with any same cell-neighboring sectors were received by PDE 25, then PDE 25 would be located at or near candidate locations 64, 69 and 70.

Otherwise, flowchart 900 continues to step 915 where PDE 25 determines if only one non-negligible beacon frequency signal strength measurement associated with a same cell-neighboring sector was received. If PDE 25 received only one non-negligible beacon frequency signal strength measurement associated with the same cell-neighboring sectors, then PDE 25 determines, in step 920, that MS 22 is located at or near one of three candidate locations: the candidate location defined by the intersection of TA belt 25 and the sector divider of the serving cell and the same cell-neighboring sector associated with the non-negligible beacon frequency signal strength measurement, and the two adjacent candidate locations. For example, suppose MS 22 is currently being served by sector β and a non-negligible beacon frequency signal strength measurements associated with sector α was received by PDE 25, then PDE 25 would be located at or near candidate locations 63, 68 and 69.

Otherwise, in step 915, it is determined that PDE 25 received non-negligible beacon frequency signal strength measurements associated with both of the same cell-neighboring sectors. Flowchart 900 continues to step 925 where PDE 25 determines that MS 22 is located at or near one of the three candidate locations: the candidate location defined by the intersection of TA belt 28 and the center divider of the serving sector, and the two adjacent candidate locations.

From steps 910, 920 and 925, flowchart 900 continues to step 930. In step 930, PDE 25 determines if non-negligible beacon frequency signal strength measurements associated with sectors belonging to at least three different cells were received in step 410. If yes, then PDE 25 determines, in step 935, a location for MS 22 using the three candidate locations determined in step 910, 920 or 925 and the non-negligible beacon frequency signal strength measurements associated with sectors of at least three different cells.

Figure 10:
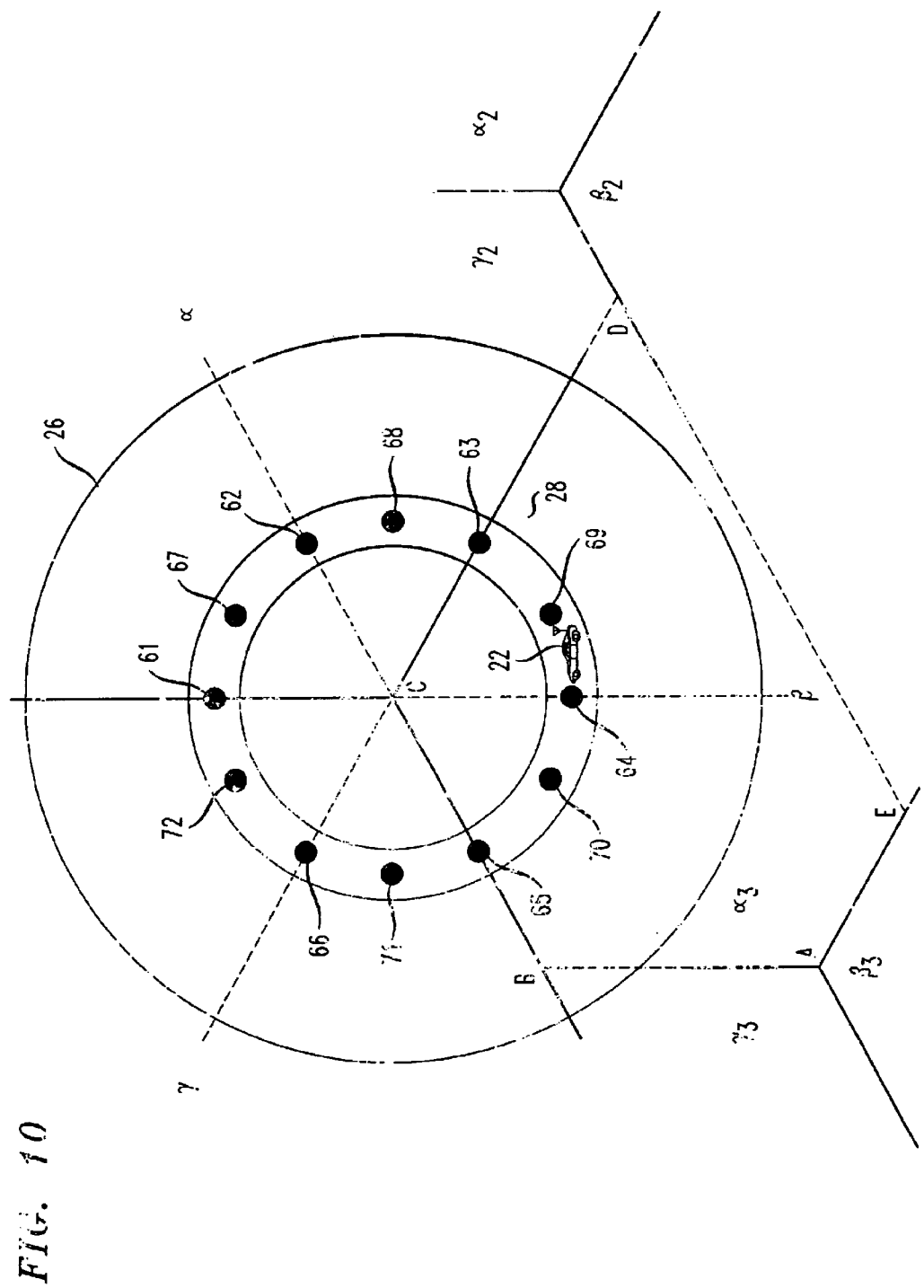
FIG. 10 depicts a constraint polygon formed using sectors $\beta$, $\gamma_2$ and $\alpha_3$.

In one embodiment, step 935 involves looking at all the non-negligible beacon frequency signal measurements and selecting sectors from each of the at least three different cells based on beacon frequency signal measurements. For example, the beacon frequency signal measurements are ranked in order from highest to lowest, and the sectors associated with the strongest measurements are selected for at least three different cells. Typically, the sectors selected would include one of the sectors belonging to the serving cell, which would probably be the serving sector. In a typical cases, the serving sector is not selected, or no sector in the serving cell is selected. Note that, in one embodiment, if there are non-negligible beacon frequency signal measurements for two or three sectors belonging to a same cell, the sector associated with the strongest non-negligible beacon frequency signal measurement would be selected for that cell. In alternate embodiments where there are non-negligible beacon frequency signal measurements for multiple sectors of a same cell, the serving sector is selected if the cell is the serving cell or the sector nearest the serving sector is selected if the cell is not the serving cell. The selected sectors are used to form constraint polygons, which are polygons formed by extending the sector dividers of the selected cells until such dividers intersect with each other. FIG. 10 depicts an example in which the selected sectors are sectors $\beta$, $\gamma_2$ and $\alpha_3$. The sector dividers of these sectors are extended until they intersect each other at points A, B, C, D and E, thus forming constraint polygon ABCDE. Candidate locations determined in step 910, 920 or 925 that fall within the confines of the constraint polygon are averaged to determine a location of MS 22.

Note that four or more sectors may be selected in step 935. In such a case, the constraint polygon can be formed by forming several different sub-constraint polygons using different combinations of three selected sectors and then finding the overlapping area of all the sub-constraint polygons. The overlapping area would be the constraint polygon. For example, if sectors $\beta$, $\gamma_2$, $\alpha_3$ and $\beta_4$ (not shown) were selected, then four different sub-constraint polygons may be formed using four sets different combination of three sectors. These four sub-constraint polygons can be laid over each other to find the area common to all four sub-constraint polygons. Such common area becomes the constraint polygon.

Figure 8:
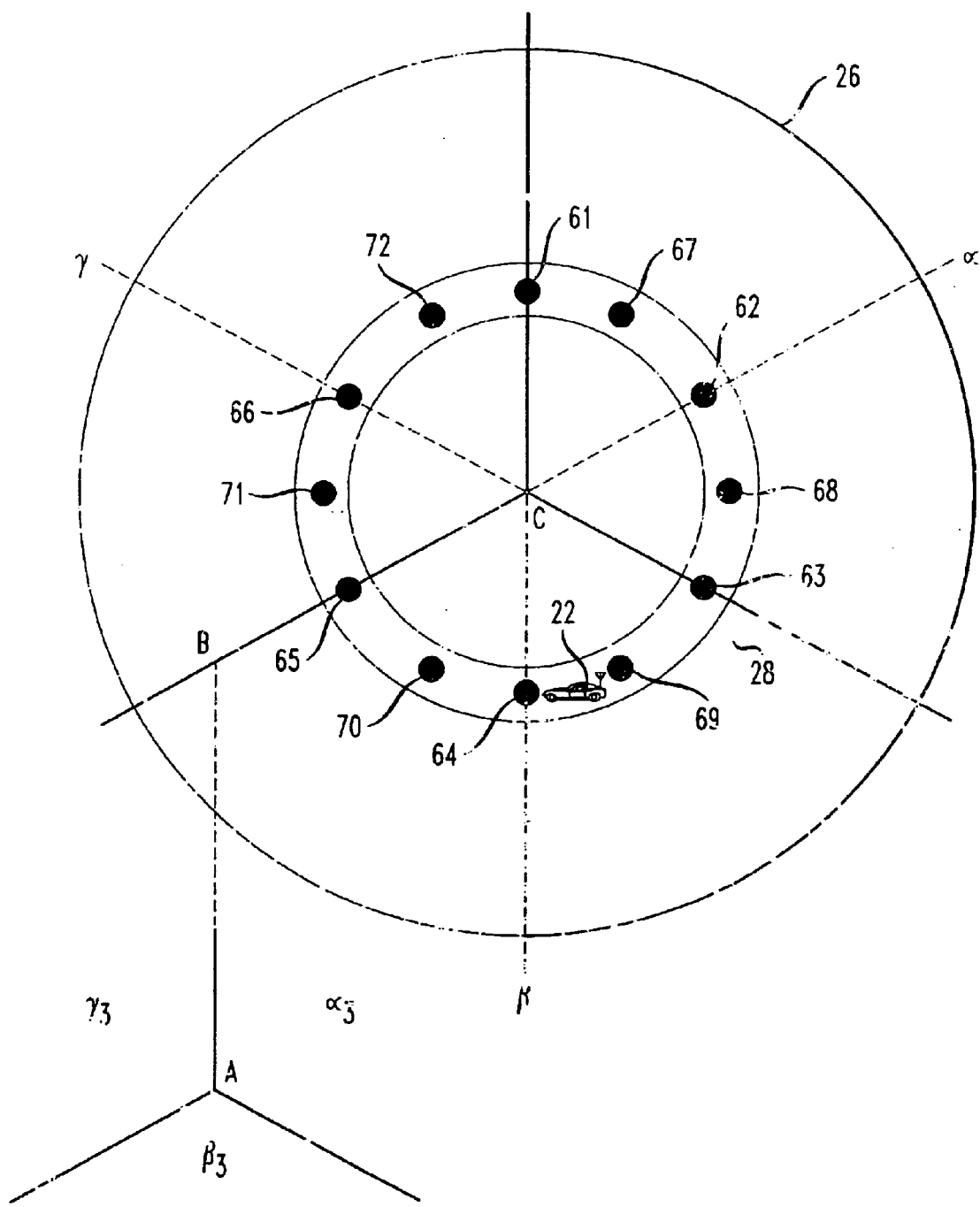
FIG. 8 depicts a degenerated constraint polygon formed using sectors $\beta$ and $\alpha_3$, wherein the degenerated constraint polygon includes points A, B and C.

If, in step 930, non-negligible beacon frequency signal strength measurement associated with sectors belonging to less than three different cells were not received in step 410, then flowchart 900 proceeds to step 940 where it determines if non-negligible beacon frequency signal strength measurement associated with sectors belonging to only two different cells were received in step 410. If yes, then PDE 25 determines, in step 945, a location for MS 22 using the three candidate locations determined in step 910, 920 or 925 and the non-negligible beacon frequency signal strength measurements associated with the sectors of the two different cells. Note that one of the selected sectors would typically be the serving sector. Specifically, step 945 involves forming a degenerated constraint polygon, i.e., constraint polygon with at least one side missing, using the sectors of the two different cells associated with the non-negligible beacon frequency signal strength measurements. For example, suppose sectors $\beta$ and $\alpha_3$ are the sectors associated with the non-negligible beacon frequency signal strength measurement. A degenerated constraint polygon is formed using these sectors $\beta$ and $\alpha_3$. FIG. 8 depicts a degenerated constraint polygon formed using sectors $\beta$ and $\alpha_3$, wherein the degenerated constraint polygon includes points A, B and C. Candidate locations determined in step 910, 920 or 925 that fall within the confines of the degenerated constraint polygon are averaged to determine a location of MS 22.

If, in step 940, there are no non-negligible beacon frequency signal strength measurement associated with any sector of a different cell then, in step 950, PDE 25 determines a location for MS 22 by averaging the three candidate locations determined in step 910, 920 or 925.

Returning to flowchart 400, in step 440, PDE 25 determines if there is a TA value associated with MS 22 for another base station other than serving BS 20. Such other base station is hereinafter referred to as a secondary serving base station, and serving BS 20 is hereinafter referred to as a primary serving base station. Note that PDE 25 would obtain the TA value associated with the secondary serving base stations as part of the information received in step 410. If there is such a TA value, hereinafter referred to as a secondary TA value, in step 450, a secondary TA belt is predicted and may be used to determine a location of MS 22 in conjunction with, or independent of, the location of MS 22 determined in step 430. Specifically, step 440 involves looking at the intersections, if any, of the primary TA belt, i.e., TA belt 28 of primary serving BS 20, and the secondary TA belt. If the two TA belts intersect at two spots, look at whether the two intersections lie within the confines of the constraint or degenerated constraint polygon, assuming either can be formed. If only one intersection lies with the confines of a constraint or degenerated constraint polygon, then the intersection lying within the confines of the constraint or degenerated constraint polygon is determined to be the location of MS 22. If both intersections lie within the confines of the constraint or degenerated constraint polygon, then the average of the two intersections is determined to be the location of MS 22. If the two TA belts only intersect at one spot, then such intersection is determined to be the location of MS 22. If the two TA belts do not intersect, then the candidate location closest to a line representing the shortest distance between the two TA belts is determined to be the location of MS 22. The location of MS 22 determined using the secondary TA value may or may not be combined with the location of MS 22 determined in step 430. For example, both locations in steps 430 and 450 may be used as the location of MS 22. Or an average of the locations may be determined as the location of MS 22. Or some interpolation of both locations may be determined to the be location of MS 22. Or one of the locations may be selected as the location of MS 22.

In step 460, PDE 25 reports the determined location of MS 22 to BS 20 and/or BS 24. If the location of MS 22 was determined by PDE 25 using local coordinates (x,y,z), PDE 25 would convert the local coordinates into global coordinates before reporting them. In an alternate embodiment, PDE 25 reports the determined location to MS 22 or some other entity.

Although the present invention has been described in considerable detail with reference to certain embodiments, other versions are possible. Therefore, the spirit and scope of the present invention should not be limited to the description of the embodiments contained herein.

We claim:

1. A method of determining a location of a mobile-station comprising the steps of:

forming a first timing advance belt using a first timing advance value associated with a first serving base station;

forming a second timing advance belt using a second timing advance value associated with a second serving base station;

determining the location of the mobile-station using the first and second timing advance belts, wherein if the first and second timing advance belts intersect at two points and only one point of intersection lies within a constraint polygon formed using signal strength measurements, the location of the mobile-station is determined to be approximately at the one point of intersection that lies within the constraint polygons, or wherein if the first and second timing advance belts intersect at two points and both points of intersection lies within a constraint polygon formed using signal strength measurements, the location of the mobile-station is determined to be approximately at an average of the two points of intersection.

2. The method of claim 1, wherein if the first and second timing advance belts do not intersect, the location of the mobile-station is determined to be approximately at a candidate position closest to a line representing a shortest distance between the first timing advance belt and the second timing advance belt, the candidate position being determined using the first timing belt, the first serving base station being a primary base station.

3. The method of claim 1, wherein if the first and second timing advance belts intersect at only one point, the location of the mobile-station is determined to be approximately at the point of intersection.

4. A method of determining a location of a mobile-station comprising the steps of:
 determining a set of candidate locations for the mobile-station based on a timing advance value associated with the mobile-station;
 determining a location of the mobile-station using the set of candidate locations and signal strength measurements associated with same cell-neighboring sectors or different cell-neighboring sectors, wherein the location of the mobile-station is determined to be approximately at a candidate location defined by an intersection of a timing advance belt and a center divider of a serving sector when there are no non-negligible signal strength measurements associated with any same cell-neighboring sector or when there are non-negligible signal strength measurements associated with two same cell-neighboring sectors.

5. A method of determining a location of a mobile-station comprising the steps of:
 determining a set of candidate locations for the mobile-station based on a timing advance value associated with the mobile-station;
 determining a location of the mobile-station using the set of candidate locations and signal strength measurements associated with same cell-neighboring sectors or different cell-neighboring sectors, wherein the location of the mobile-station is determined to be approximately at a candidate location defined by an intersection of a timing advance belt and a sector divider of a serving sector and a same cell-neighboring sector associated with a non-negligible signal strength measurement when there is only one same cell-neighboring sector associated with a non-negligible signal strength measurement.

6. The method of claim 4 or 5, wherein the timing advance value associated with the set of candidate locations being determined is a first timing advance value associated with a first serving base station, the location of the mobile-station being determined using the first timing advance value and a second timing advance value associated with a second serving base station along with the set of candidate locations and signal strength measurements associated with same cell-neighboring sectors or different cell-neighboring sectors when the second timing advance value is available.

7. The method of claim 4 or 5, wherein the step of determining the location of the mobile-station using the set of candidate locations comprises the step of:
 determining a subset of candidate locations from the set of candidate locations using the signal strength measurements associated with the same cell-neighboring sectors; and
 determining the location of the mobile-station using the subset of the candidate locations and the signal strength measurements associated with the different cell-neighboring sectors.

8. The method of claim 7, wherein if there are non-negligible signal strength measurements associated with sectors of only two different cells, the step of determining the location of the mobile-station using the subset of the candidate locations comprises the step of:
 forming a degenerated constraint polygon using the sectors of the two different cells associated with the non-negligible signal strength measurements; and
 determining the location of the mobile-station using the candidate locations belonging to the subset of candidate locations that lie within the degenerated constraint polygon.

9. The method of claim 8, wherein the timing advance value associated with the set of candidate locations being determined is a first timing advance value associated with a first serving base station, the method comprising the additional steps of:
 forming a first timing advance belt using the first timing advance value; and
 forming a second timing advance belt using a second timing advance value, the second timing advance value being associated with a second serving base station, the location of the mobile-station being determined using intersections of the first and second timing advance belts and the degenerated constraint polygon when the first and second timing advance belts intersect at two points.

10. The method of claim 9, wherein if only one point of intersection lies within the degenerated constraint polygon, the location of the mobile-station is determined to be approximately at the point of intersection that lies within the degenerated constraint polygon.

11. The method of claim 9, wherein if the two points of intersection lie within the degenerated constraint polygon, the location of the mobile-station is determined to be approximately at an average of the two points of intersection.

12. The method of claim 8, wherein the location of the mobile-station is determined to be approximately at an average of the candidate locations belonging to the subset of candidate locations that lie within the degenerated constraint polygon.

13. The method of claim 7, wherein if there are non-negligible signal strength measurements associated with sectors of at least three different cells, the step of determining the location of the mobile-station using the subset of the candidate locations comprises the step of:
 forming constraint polygons using sectors from three different cells associated with the non-negligible signal strength measurements; and
 determining the location of the mobile-station using the candidate locations belonging to the subset of candidate locations that lie within the constraint polygons.

14. The method of claim 13, wherein the location of the mobile-station is determined to be approximately at an average of the candidate locations belonging to the subset of candidate locations that lie within the constraint polygons.

15. The method of claim 7, wherein if there are no non-negligible signal strength measurements associated with any same cell-neighboring sector or when there are non-negligible signal strength measurements associated with two same cell-neighboring sectors, the subset of candidate locations include a first candidate location defined by an intersection of a timing advance belt and a center divider of a serving sector, a second candidate location and a third candidate location, the second and third candidate locations each being adjacent to the first candidate location.

16. The method of claim 7, wherein if there is only one same cell-neighboring sector associated with a non-negligible signal strength measurement, the subset of candidate locations include a first candidate location defined by an intersection of a timing advance belt and a sector divider of a serving sector and the same cell-neighboring sector associated with the non-negligible signal strength measurement, a second candidate location and a third candidate location, the second and third candidate locations each being adjacent to the first candidate location.

17. The method of claim 7, wherein if there are no non-negligible signal strength measurements associated with sectors of at least two different cells, the location of the mobile-station is determined to be approximately at an average of the candidate locations belonging to the subset of candidate locations.

* * * * *